(12) United States Patent
Date (10) Patent No.: US 11,405,023 B2
(45) Date of Patent: Aug. 2, 2022

(54) SEMICONDUCTOR INTEGRATED CIRCUIT DEVICE

(71) Applicant: SOCIONEXT INC., Kanagawa (JP)

(72) Inventor: Koshiro Date, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 83 days.

(21) Appl. No.: 17/013,303

(22) Filed: Sep. 4, 2020

(65) Prior Publication Data

US 2020/0403605 A1 Dec. 24, 2020

Related U.S. Application Data

(63) Continuation of application No. PCT/JP2019/006074, filed on Feb. 19, 2019.

(30) Foreign Application Priority Data

Mar. 7, 2018 (JP) .............................. JP2018-040763

(51) Int. Cl.
*H03K 3/037* (2006.01)
*G06F 30/392* (2020.01)
*G06F 119/12* (2020.01)
*H01L 27/092* (2006.01)
*H01L 29/78* (2006.01)

(52) U.S. Cl.
CPC ......... *H03K 3/0372* (2013.01); *G06F 30/392* (2020.01); *G06F 2119/12* (2020.01); *H01L 27/092* (2013.01); *H01L 29/7827* (2013.01)

(58) Field of Classification Search
CPC . H03K 3/0372; G06F 30/392; G06F 2119/12; H01L 27/092; H01L 29/7827
See application file for complete search history.

(56) References Cited

U.S. PATENT DOCUMENTS

| 6,762,638 B2* | 7/2004 | Correale, Jr. ...... H03K 3/35625 |
| | | 327/204 |
| 10,024,909 B2* | 7/2018 | Semenov ........... H03K 3/35625 |
| 2011/0032016 A1 | 2/2011 | Maeno |
| 2016/0012169 A1 | 1/2016 | Chiang et al. |
| 2016/0063163 A1 | 3/2016 | Moroz et al. |
| 2017/0179134 A1 | 6/2017 | Liaw |

(Continued)

FOREIGN PATENT DOCUMENTS

| JP | 2011-040826 A | 2/2011 |
| WO | 2017/191799 A1 | 11/2017 |

OTHER PUBLICATIONS

International Search Report and Written Opinion issued in International Patent Application No. PCT/JP2019/006074, dated May 7, 2019; with partial English translation.

*Primary Examiner* — Dinh T Le
(74) *Attorney, Agent, or Firm* — McDermott Will & Emery LLP (57) ABSTRACT

A semiconductor integrated circuit device includes a flipflop circuit using vertical nanowire (VNW) FETs. A latch unit of the flipflop circuit includes: a feedback node; first p-type and n-type transistors each of which receives an input signal at one node and is connected to the feedback node at the other node; and second p-type and n-type transistors each connected to the feedback node at one node. In a standard cell, the tops of the first and second p-type and n-type transistors are connected to the feedback node.

4 Claims, 9 Drawing Sheets

(56) References Cited

U.S. PATENT DOCUMENTS

| | | |
|---|---|---|
| 2019/0074297 A1 | 3/2019 | Kishishita et al. |
| 2020/0135740 A1* | 4/2020 | Liaw .................. H01L 27/1104 |
| 2020/0287540 A1* | 9/2020 | Smith .................... H01L 27/18 |

* cited by examiner

SEMICONDUCTOR INTEGRATED CIRCUIT DEVICE

CROSS-REFERENCE TO RELATED APPLICATIONS

This is a continuation of International Application No. PCT/JP2019/006074 filed on Feb. 19, 2019, which claims priority to Japanese Patent Application No. 2018-040763 filed on Mar. 7, 2018. The entire disclosures of these applications are incorporated by reference herein.

BACKGROUND

The present disclosure relates to a semiconductor integrated circuit device provided with vertical nanowire (VNW) field effect transistors (FETs), and more particularly to a layout structure of a standard cell that implements a flipflop circuit.

A standard cell method is known as a method of forming a semiconductor integrated circuit on a semiconductor substrate. The standard cell method is a method in which basic units (e.g., inverters, latches, flipflops, and full adders) having specific logical functions are prepared in advance as standard cells, a plurality of standard cells are placed on a semiconductor substrate, and such standard cells are connected by interconnects, thereby designing an LSI chip.

As for transistors as basic constituents of an LSI, improvement in integration degree, reduction in operating voltage, and improvement in operating speed have been achieved thanks to scaling down of the gate length. Recently, however, an increase in off current due to excessive scaling and the resulting significant increase in power consumption have raised a problem. To solve this problem, three-dimensional transistors having a three-dimensional structure changed from the conventional planar structure have been vigorously studied. As one type of such transistors, a vertical nanowire FET (hereinafter referred to as a VNW FET as appropriate) has attracted attention.

U.S. Unexamined Patent Application Publication No. 2016/0063163 discloses a layout of a two-input NAND using VNW FETs. U.S. Unexamined Patent Application Publication No. 2016/0012169 discloses a layout of an inverter using VNW FETs.

SUMMARY

In a fabrication process of a semiconductor microstructure, preventing or reducing fabrication variations is a major problem to be tackled, and this is also true for a semiconductor integrated circuit device using VNW FETs. It is also a major problem to reduce the area of the semiconductor integrated circuit device. In particular, implementing a flipflop circuit with a reduced area is important for achieving reduction in the area of a semiconductor integrated circuit because a flipflop circuit has a high use frequency and a large circuit scale.

Neither of the cited patent documents however discloses a layout structure of a flipflop circuit using VNW FETs. Besides, there is not found any prior art document that discloses a layout structure of a flipflop circuit using VNW FETs.

An objective of the present disclosure is providing a layout structure of a semiconductor integrated circuit device provided with a flipflop circuit using VNW FETs, which realizes reduction in area.

In the first mode of the present disclosure, a semiconductor integrated circuit device includes a standard cell configured to implement a flipflop circuit, wherein the flipflop circuit includes a latch unit, the latch unit includes a feedback node, a first p-type transistor and a first n-type transistor each of which receives an input signal at one node and is connected to the feedback node at the other node, and a second p-type transistor and a second n-type transistor each of which is connected to the feedback node at one node, and in the standard cell, the first and second p-type transistors and the first and second n-type transistors are vertical nanowire (VNW) FETs and are connected to the feedback node at their top electrodes.

According to the mode described above, in the latch unit of the flipflop circuit, the first and second p-type transistors and the first and second n-type transistors, to be connected to the feedback node via their nodes, are connected to the feedback node at their tops. This can reduce the number of signal interconnects for the connection to the feedback node, and thus can reduce the area of the standard cell.

In the second mode of the present disclosure, a semiconductor integrated circuit device includes a standard cell configured to implement a flipflop circuit, wherein the flipflop circuit includes a latch unit, the latch unit includes a first p-type transistor configured to receive a first clock at its gate electrode, a first n-type transistor configured to receive a second clock that is a reversed clock from the first clock, at its gate electrodes, a second p-type transistor configured to receive the second clock at its gate electrode, and a second n-type transistor configured to receive the first clock at its gate electrodes, and in the standard cell, the first and second p-type transistors and the first and second n-type transistors are vertical nanowire (VNW) FETs, the first p-type transistor and the second n-type transistor are placed at the same position in a first direction, and their gate electrodes are mutually connected by a first gate interconnect, and the first n-type transistor and the second p-type transistor are placed at the same position in the first direction, and their gate electrodes are mutually connected by a second gate interconnect.

According to the mode described above, in the latch unit, the first p-type transistor and the second n-type transistor that receive the first clock at their gates are placed at the same position in the first direction, and their gates are mutually connected. Also, the first n-type transistor and the second p-type transistor that receive the second clock at their gates are placed at the same position in the first direction, and their gates are mutually connected. This can reduce the number interconnects for the gate connection and thus can reduce the area of the standard cell.

In the third mode of the present disclosure, a semiconductor integrated circuit device includes a standard cell, Therein the standard cell includes first, second, and third transistors of a first conductivity type that are vertical nanowire (VNW) FETs and a bottom region to which bottom electrodes of the first, second, and third transistors are connected in common, and top electrodes of the first, second, and third transistors are electrically isolated from one another.

According to the mode described above, the bottoms of the first, second, and third transistors of the same conductivity type are connected to the common bottom region, and the tops thereof are electrically isolated from one another. That is, for the first, second, and third transistors of the same conductivity type of which the nodes on one side are mutually connected and the nodes on the other side are electrically isolated from one another, the mutually connected nodes are set to be the bottoms and connected to the common bottom region, whereby the area of the standard cell can be reduced.

According to the present disclosure, it is possible to prevent or reduce fabrication variations and realize reduction in area for a semiconductor integrated circuit device provided with a flipflop circuit using VNW FETs.

BRIEF DESCRIPTION OF THE DRAWINGS

FIGS. 8A and 8B are schematic views showing a basic structure example of vertical nanowire FETs, where

DETAILED DESCRIPTION

An embodiment of the present disclosure will be described hereinafter with reference to the accompanying drawings. In the following embodiment, it is assumed that a semiconductor integrated circuit device includes a plurality of standard cells and that at least some of the plurality of standard cells include so-called vertical nanowire FETs (VNW FETs).

Figure 8A:
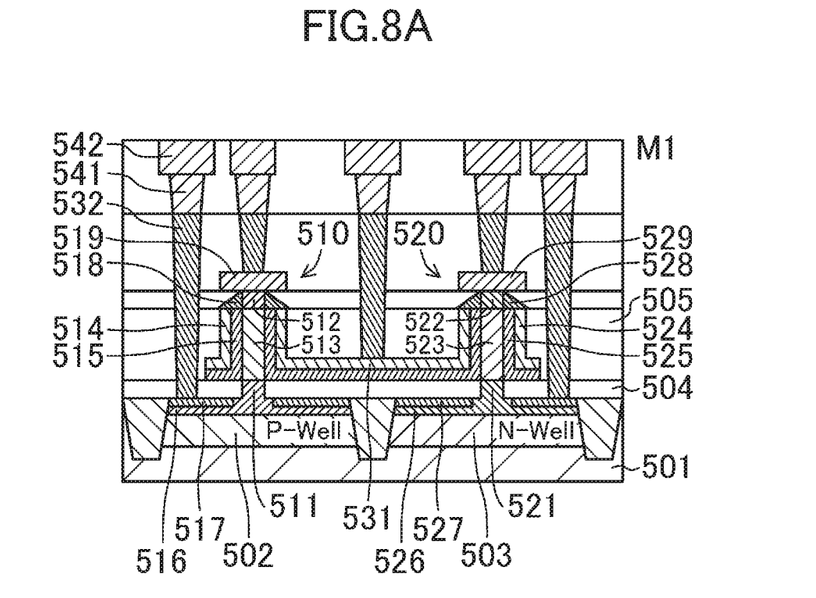
FIG. 8A is a cross-sectional view and FIG. 8B is a plan view.
Figure 8B:
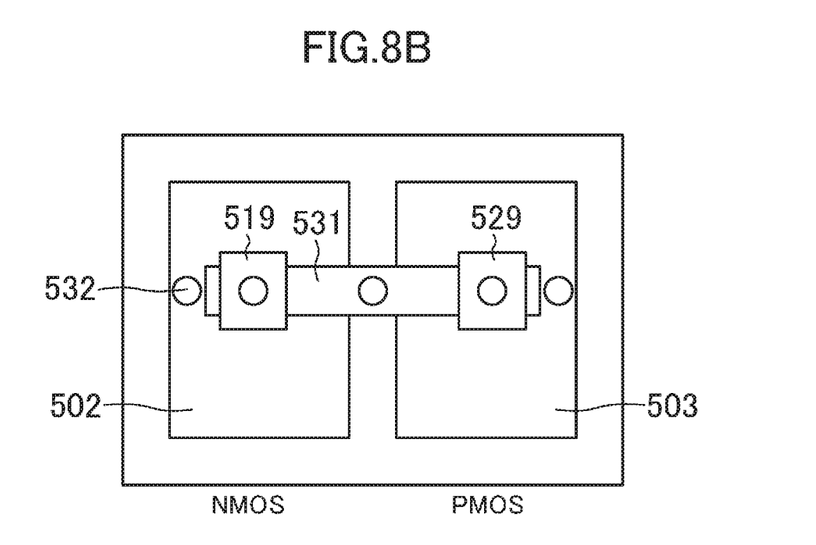

FIGS. 8A and 8B are schematic views showing a basic structure example of VNW FETs, where FIG. 8A is a cross-sectional view and FIG. 8B is a plan view. Note that, in FIG. 8B, illustration of metal interconnects is omitted and, for easy understanding, constituents invisible when actually viewed from top are illustrated.

As shown in FIGS. 8A and 8B, a p-well 502 and an n-well 503 are formed on a semiconductor substrate 501. Note however that no p-well may be formed when the semiconductor substrate 501 is a p-type substrate. A VNW FET 510 that is an n-type transistor is formed on the p-well 502, and a VNW FET 520 that is a p-type transistor is formed on the n-well 503. The reference numeral 504 denotes an insulating film, and 505 denotes an interlayer insulating film.

The VNW FET 510 includes a bottom electrode 511 that is to be a source/drain electrode, a top electrode 512 that is to be a source/drain electrode, and a nanowire 513 formed vertically (perpendicularly to the substrate surface) between the bottom electrode 511 and the top electrode 512. The bottom electrode 511 and the top electrode 512 are doped to have n-type conductivity. At least part of the nanowire 513 is to be a channel region. A gate insulating film 515 is formed around the nanowire 513, and a gate electrode 514 is formed around the gate insulating film 515. The gate electrode 514 may surround the entire of the nanowire 513, or may surround only part of the nanowire 513. When the gate electrode 514 surrounds only part of the nanowire 513, the gate insulating film 515 may be formed on only the portion of the nanowire 513 surrounded by the gate electrode 514.

The bottom electrode 511 is connected with a bottom region 516 formed to spread over the top surface of the semiconductor substrate 501. The bottom region 516 is also doped to have n-type conductivity. A silicide region 517 is formed on the surface of the bottom region 516. A sidewall 518 is formed around the top electrode 512, and a silicide region 519 is formed on the top of the top electrode 512. Note that the sidewall 518 and the silicide region 519 may not be formed.

Likewise, the VNW FET 520 includes a bottom electrode 521 that is to be a source/drain electrode, a top electrode 522 that is to be a source/drain electrode, and a nanowire 523 formed vertically between the bottom electrode 521 and the top electrode 522. The bottom electrode 521 and the top electrode 522 are doped to have p-type conductivity. At least part of the nanowire 523 is to be a channel region. A gate insulating film 525 is formed around the nanowire 523, and a gate electrode 524 is formed around the gate insulating film 525.

The bottom electrode 521 is connected with a bottom region 526 formed to spread over the top surface of the semiconductor substrate 501. The bottom region 526 is also doped to have p-type conductivity. A silicide region 527 is formed on the surface of the bottom region 526. A sidewall 528 is formed around the top electrode 522, and a silicide region 529 is formed on the top of the top electrode 522. Note that the sidewall 528 and the silicide region 529 may not be formed.

In the structure of FIGS. 8A and 8B, the gate electrode region 514 of the VNW FET 510 and the gate electrode region 524 of the VNW FET 520 are mutually connected through a gate interconnect 531. Also, the bottom region 516, the silicide region 519, the gate interconnect 531, the silicide region 529, and the bottom region 526 are individually connected to interconnects 542 formed in a metal interconnect layer M1 via contacts 532 and contacts 541. Another metal interconnect layer may be formed above the metal interconnect layer M1.

The semiconductor substrate 501 is made of any of bulk Si, germanium, and compounds and alloys thereof, for example. Examples of the n-type dopant include As, P, Sb, N, C, and combinations thereof. Examples of the p-type dopant include B, BF2, In, N, C, and combinations thereof. The planar shape of the VNW FETs 510 and 520 (transverse sectional shape of the nanowires 513 and 523) may be a circle, a rectangle, or an ellipse, for example.

Examples of the material of the insulating film 504 include SiN and SiCN. Examples of the material of the interlayer insulating film 505 include SiO, TEOS, PSG, BPSG, FSG, SiOC, SOG, spin-on polymers, SiC, and mixtures thereof. Examples of the material of the silicide regions 517 and 527 include NiSi, CoSi, TiSi, and WSi.

Examples of the material of the gate electrodes 514 and 524 and the gate interconnect 531 include TiN, TaN, TiAl, Ti-containing metal, Ta-containing metal, Al-containing metal, W-containing metal, TiSi, NiSi, PtSi, polysilicon with silicide, and mixtures thereof. Examples of the material of the gate insulating films 515 and 525 include SiON, $Si_3N_4$, $Ta_2O_5$, $Al_2O_3$, Hf oxide, Ta oxide, and Al oxide. The k value is preferably 7 or higher.

As the material of the silicide regions 519 and 529 provided on the top electrodes 512 and 522. NiSi, CoSi, MoSi, WSi, PtSi, TiSi, and mixtures thereof may be used. As another configuration, metals such as W, Cu, and Al, alloys such as TiN and TaN, impurity-implanted semiconductors, and mixtures thereof may be used. As the material of the sidewalls 518 and 528, SiN, SiON, SiC, SiCN, and SiOCN, for example, may be used.

As the material of the contacts 532, Ti, TiN, Ta, and TaN, for example, may be used. Cu, Cu alloy, W, Ag, Au, Ni, and Al may also be used. Alternatively, Co and Ru may be used.

Figure 9A:
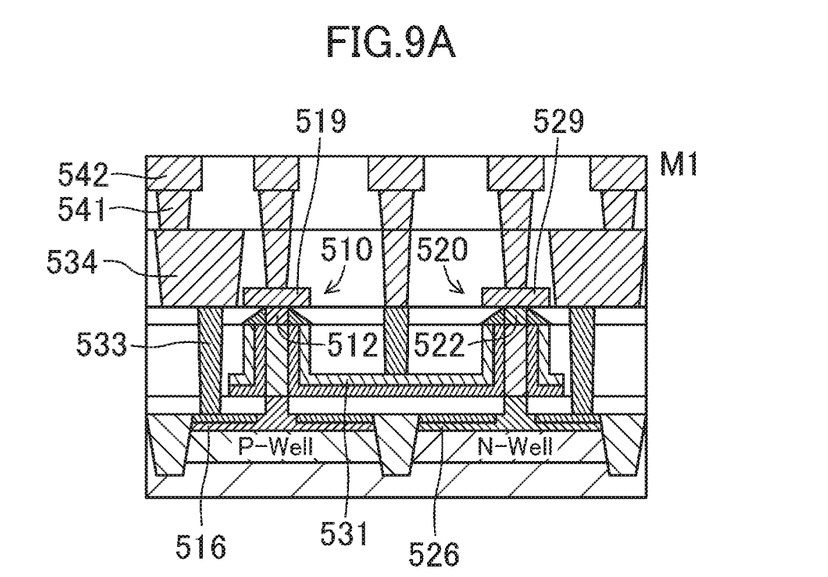
FIGS. 9A and 9B are schematic cross-sectional views showing basic structure examples of vertical nanowire FETs in which local interconnects are used.
Figure 9B:
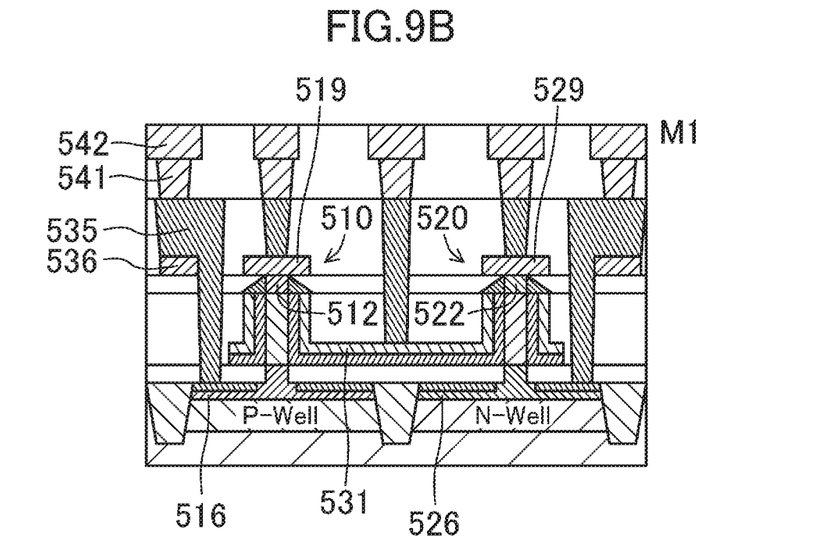

FIGS. 9A and 9B show basic structure examples of VNW FETs in which local interconnects are used. In FIG. 9A, local interconnects 534 are formed between the metal interconnect layer M1 and the top electrodes 512 and 522 of the VNW FETs 510 and 520. The bottom regions 516 and 526 and the gate interconnect 531 are individually connected to the interconnects 542 formed in the metal interconnect layer M1 via contacts 533, local interconnects 534, and the contacts 541. The silicide regions 519 and 529 are individually connected to the interconnects 542 formed in the metal interconnect layer M1 via the local interconnects 534 and the contacts 541.

In FIG. 9B, local interconnects 535 are formed between the metal interconnect layer M1 and the bottom regions 516 and 526. In other words, the local interconnect 535 corresponds to an integrated form of the contact 533 and the local interconnect 534 in FIG. 9A. Silicide regions 536 are used as an etching stopper in the process of forming the local interconnects 535.

As used herein, a VNW FET (transistor) that contributes to a logical function of the standard cell is called an "active VNW FET (transistor)," and a VNW FET that does not contribute to any logical function of the standard cell is called a "dummy VNW FET (transistor)." In the following description, the bottom electrode, top electrode, and gate electrode of a VNW FET are simply referred to as the bottom, the top, and the gate, respectively, as appropriate. Also, it is assumed that, when one or a plurality of configuration units, each constituted by a vertical nanowire, a top, a bottom, and a gate, constitute one VNW FET, this configuration unit is simply referred to as a "VNW" to distinguish this from the VNW FET. The standard cell is simply referred to as a cell as appropriate.

As used herein, an expression indicating that widths, etc. are the same, like the "same interconnect width" should be understood as including a range of fabrication variations.

Embodiment

Figure 1:
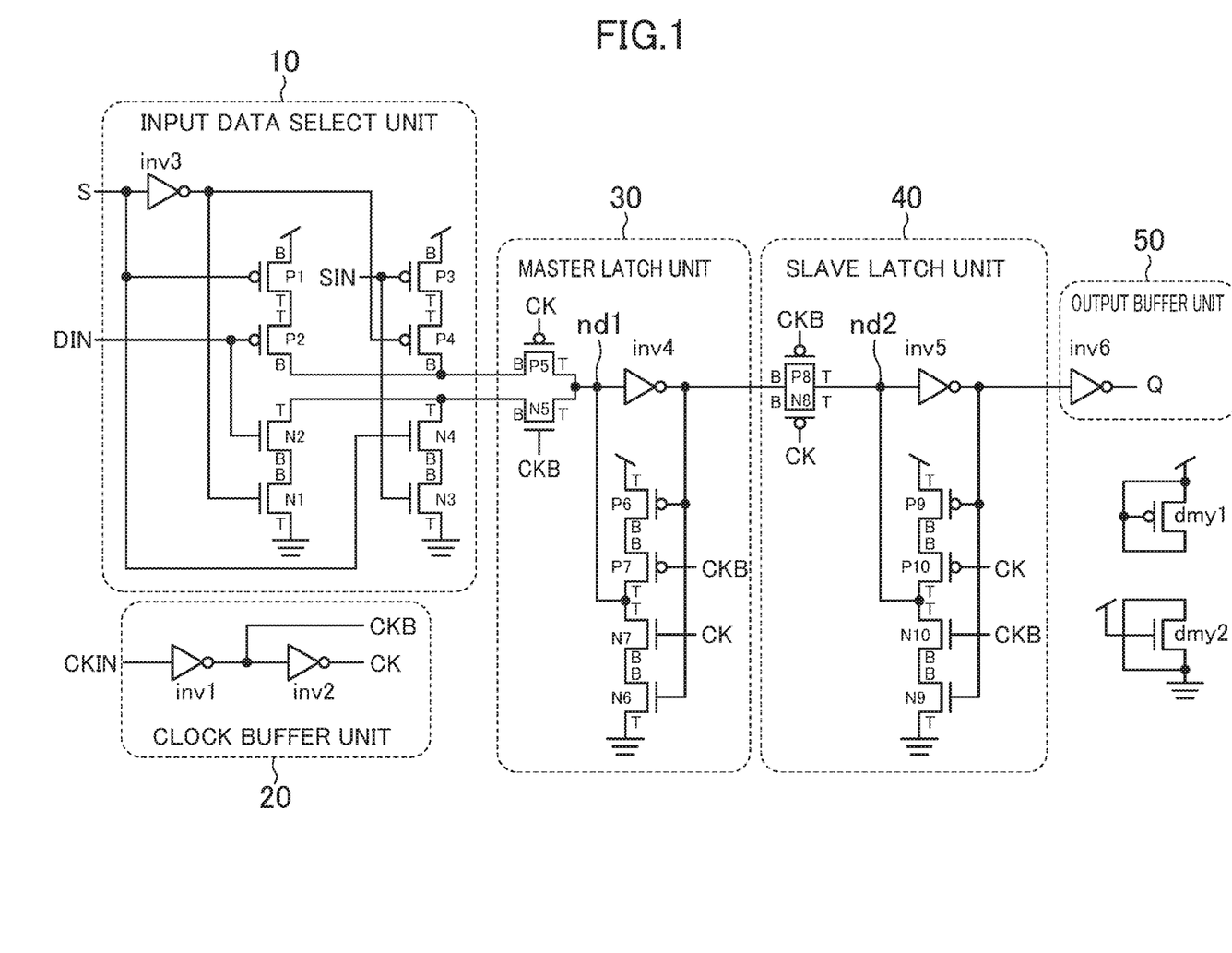
FIG. 1 is a circuit diagram of a flipflop circuit according to an embodiment.

FIG. 1 is a circuit diagram of a flipflop circuit according to an embodiment. The flipflop circuit shown in FIG. 1 is a flipflop circuit having a scan function. The flipflop circuit includes an input data select unit 10, a clock buffer unit 20, a master latch unit 30, a slave latch unit 40, and an output buffer unit 50. Note that dummy transistors dmy1 and dmy2 are included in a layout structure to be described later.

The input data select unit 10 receives data input DIN, scan data input SIN, and a scan mode signal S, and outputs a signal corresponding to either the data input DIN or the scan data input SIN in accordance with the scan mode signal S. It is herein assumed that the scan mode signal S indicates a normal mode when it is low and indicates a scan mode when it is high. The input data select unit 10 outputs a signal corresponding to the data input DIN when the scan mode signal S is low indicating the normal mode, and outputs a signal corresponding to the scan data input SIN when the scan mode signal S is high indicating the scan mode. The input data select unit 10 includes an inverter inv3, p-type transistors P1, P2, P3, and P4, and n-type transistors N1, N2, N3, and N4.

The clock buffer unit 20 generates, upon receipt of clock input CKIN, internal clocks CK and CKB to be supplied to the master latch unit 30 and the slave latch unit 40. The clock buffer unit 20 includes inverters inv1 and inv2.

The master latch unit 30 temporarily holds the output of the input data select unit 10 and outputs it at the timing of edges of the internal clocks CK and CKB. The master latch unit 30 includes a feedback node nd1, an inverter inv4, p-type transistors P5, P6, and P7, and n-type transistors N5, N6, and N7.

The slave latch unit 40 temporarily holds the output of the master latch unit 30 and outputs it at the timing of edges of the internal clocks CK and CKB. The slave latch unit 40 includes a feedback node nd2, an inverter inv5, p-type transistors P8, P9, and P10, and n-type transistors N8, N9, and N10.

The output buffer unit 50 receives the output of the slave latch unit 40 and outputs data output Q outside the flipflop circuit. The output buffer unit 50 includes an inverter inv6.

In this embodiment, the transistors shown in FIG. 1, i.e., the p-type transistors P1 to P10, the n-type transistors N1 to N10, transistors constituting the inverters inv1 to inv5, and the dummy transistors dmy1 and dmy2 are all VNW FETs. Note that the characters "T" and "B" given to the sources/drains of the transistors in FIG. 1 represent "top" and "bottom," respectively.

Figure 2:
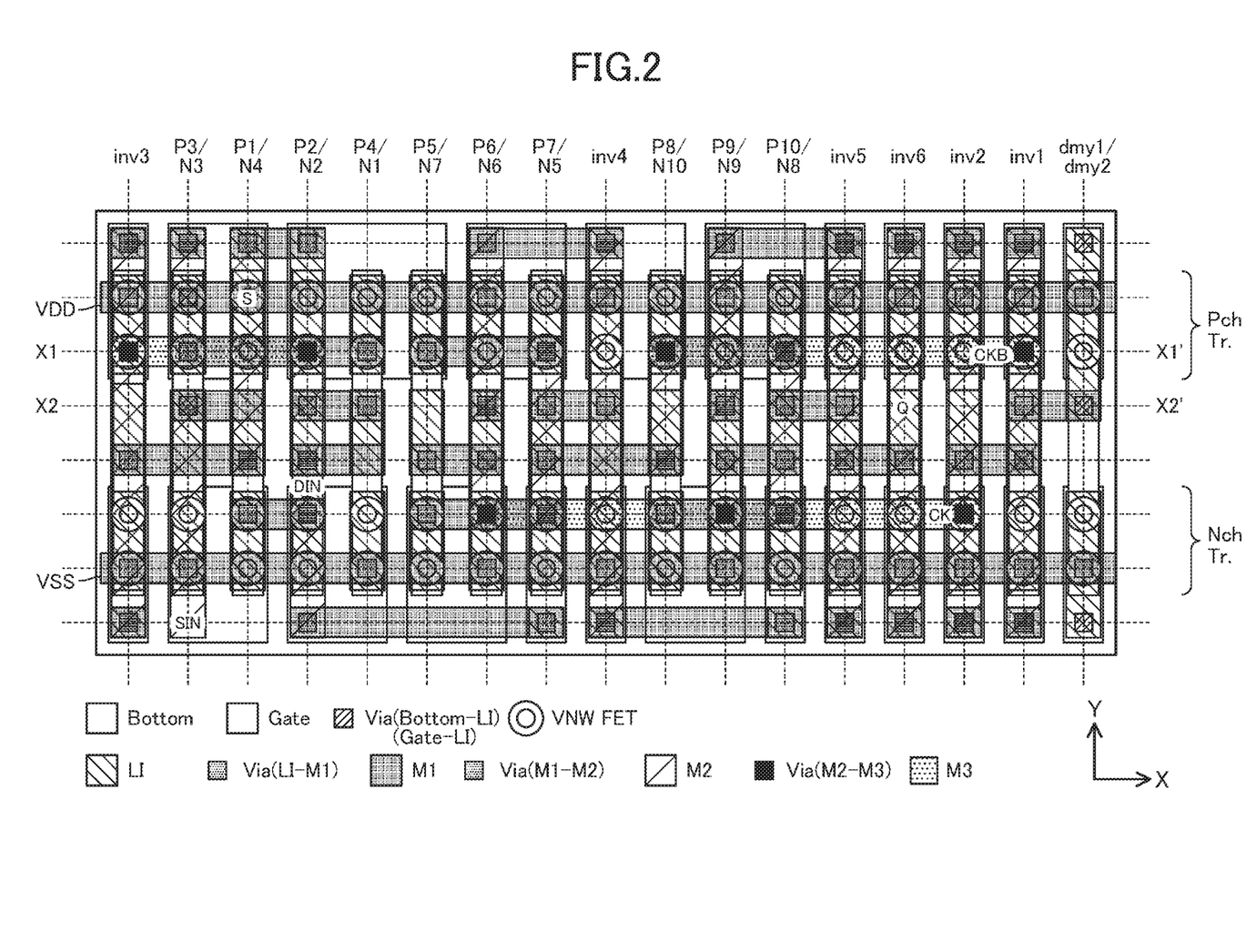
FIG. 2 is a plan view showing an example of a layout structure of the flipflop circuit according to the embodiment.
Figure 3A:
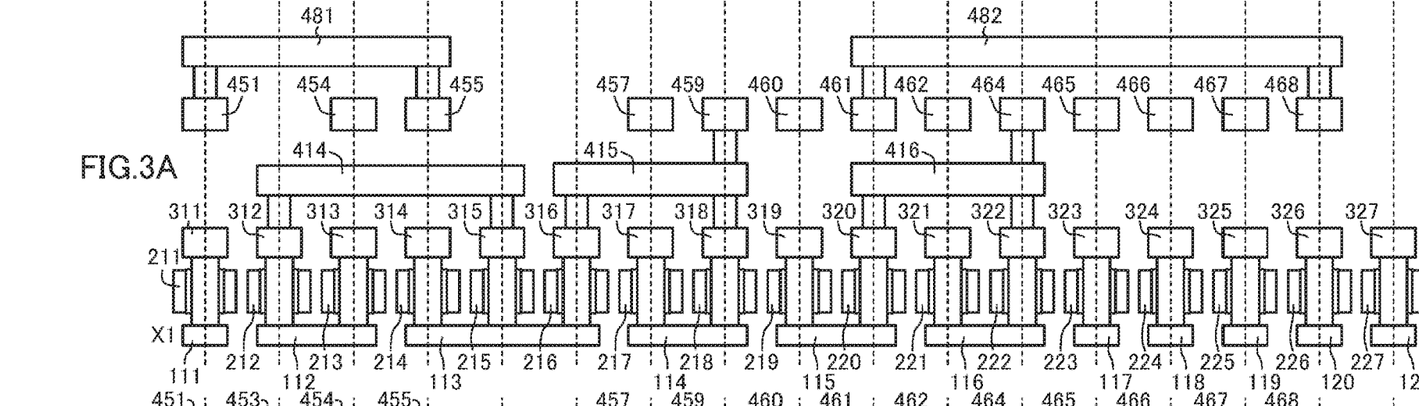
FIGS. 3A and 3B are cross-sectional views showing the layout structure of the flipflop circuit according to the embodiment.
Figure 3B:
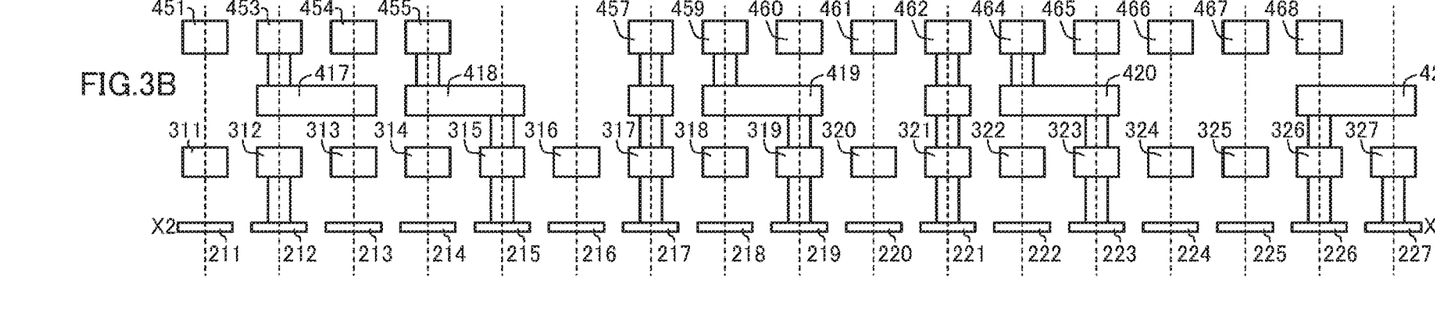
Figure 4:
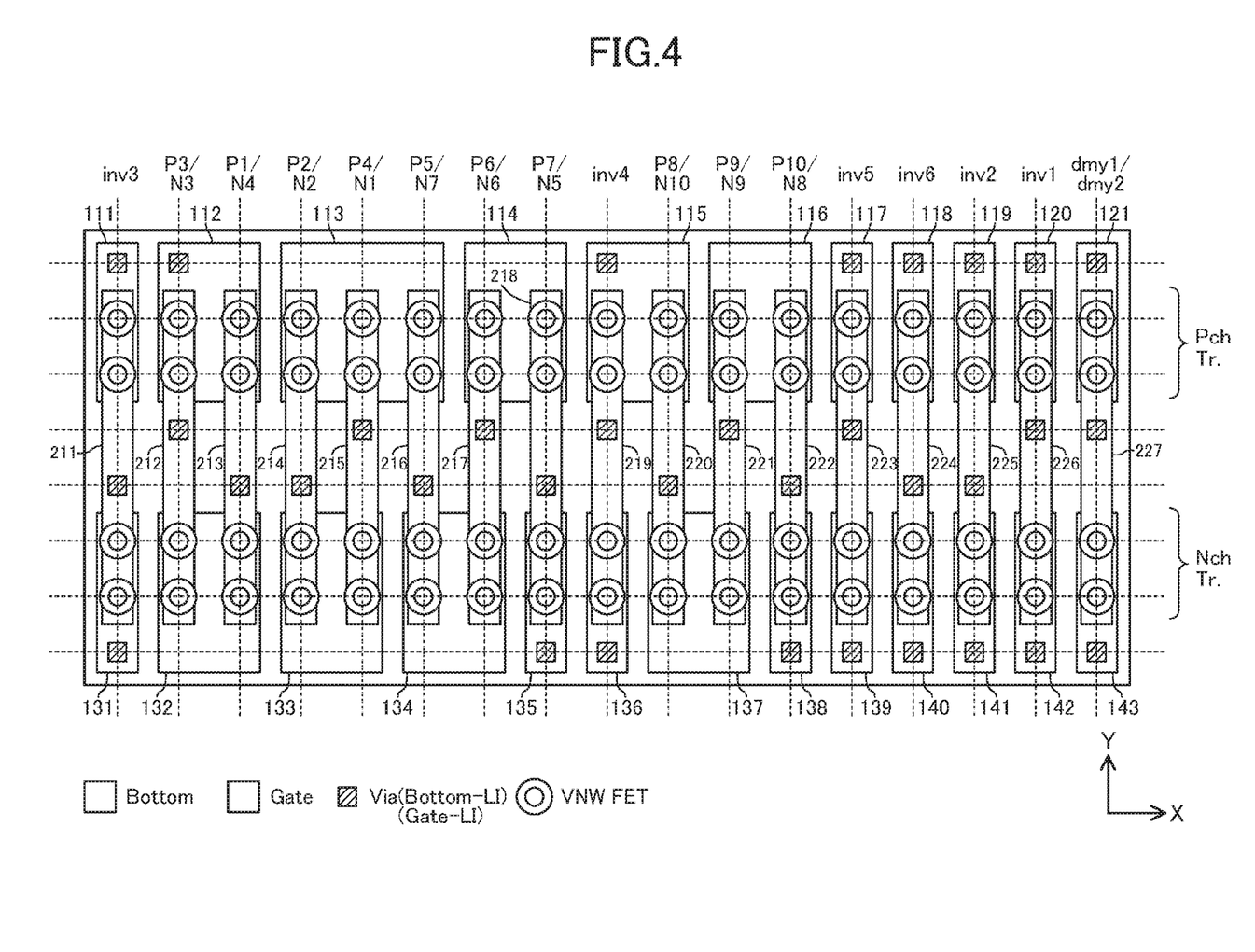
FIG. 4 is a layer-by-layer plan view of the layout structure of FIG. 2.
Figure 5:
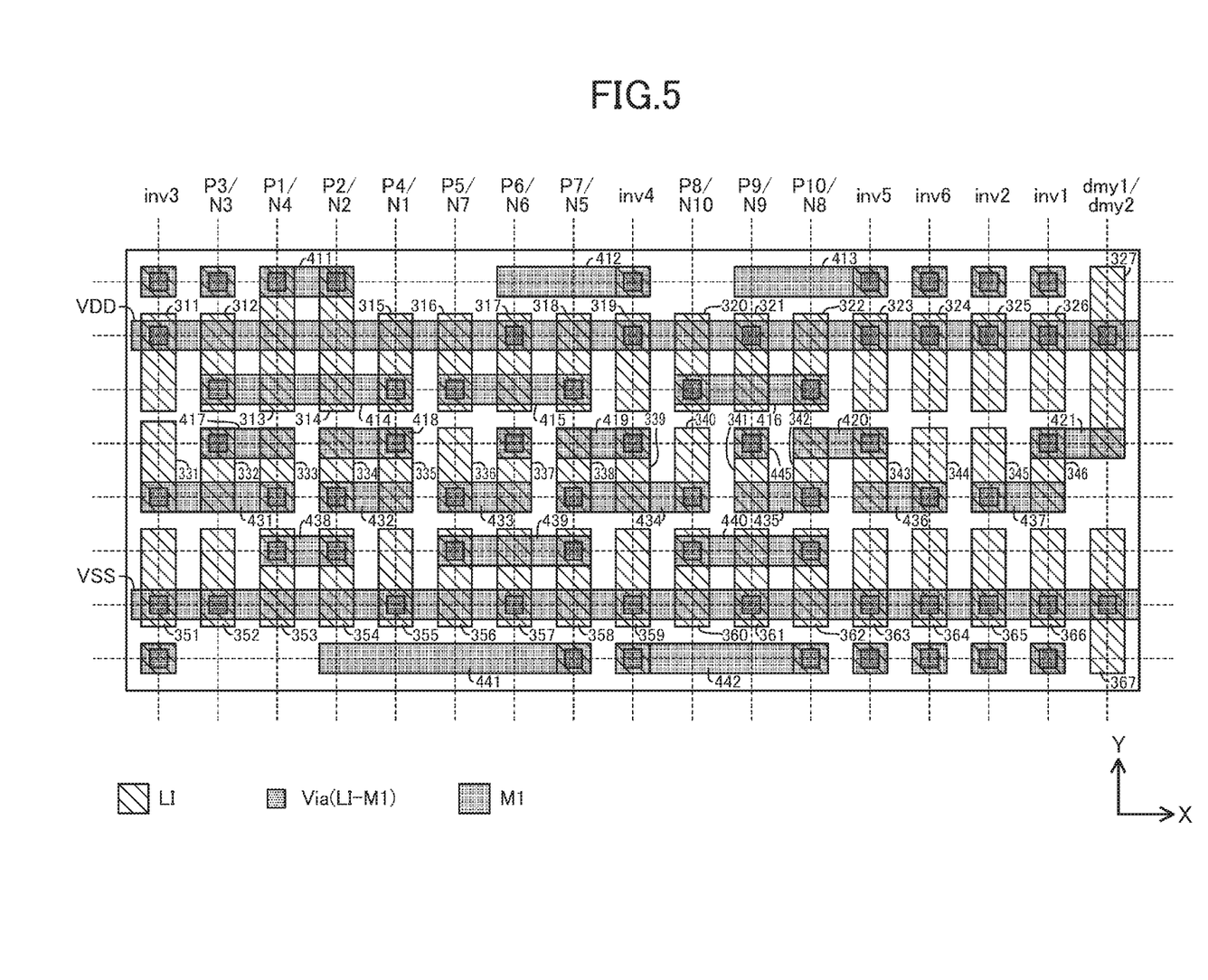
FIG. 5 is a layer-by-layer plan view of the layout structure of FIG. 2.
Figure 6:
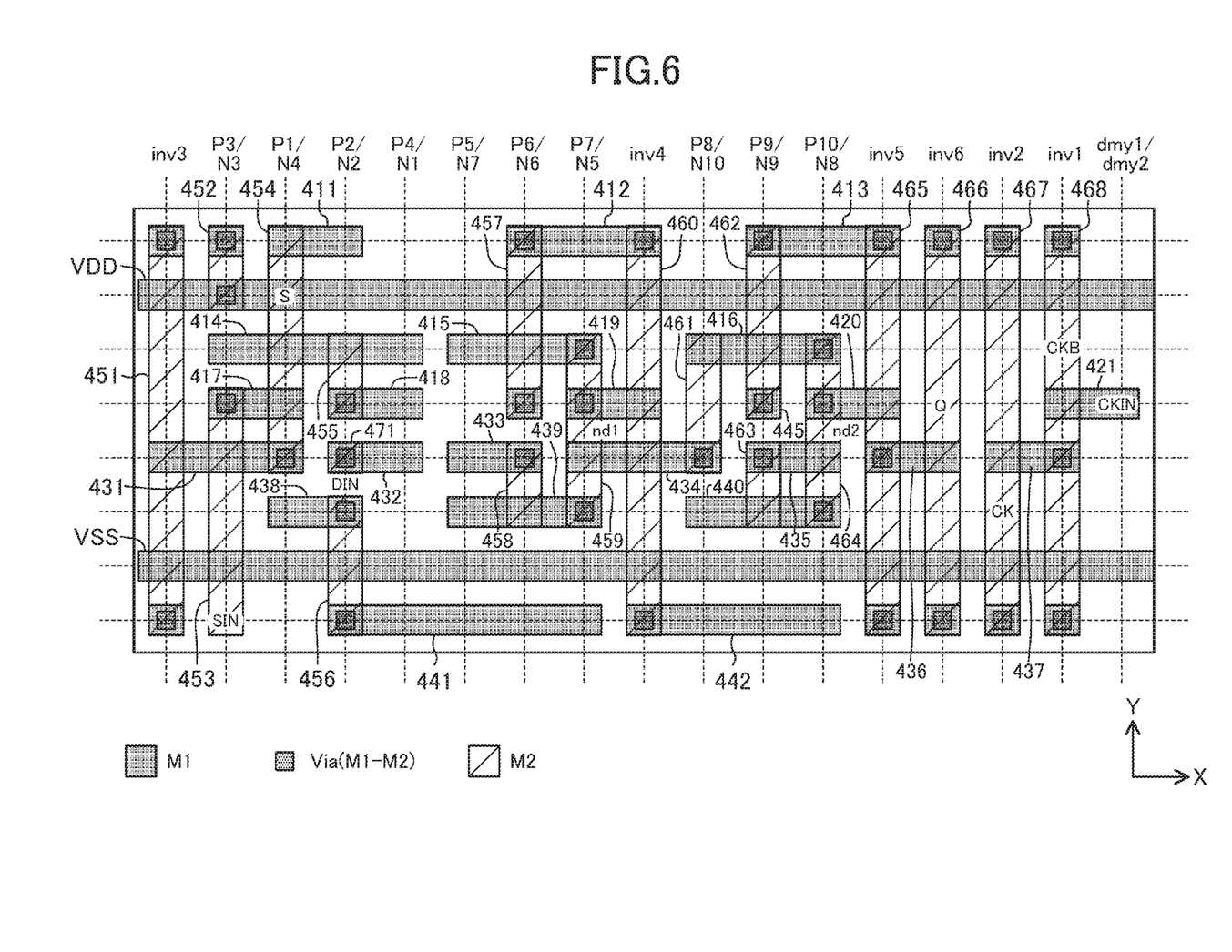
FIG. 6 is a layer-by-layer plan view of the layout structure of FIG. 2.
Figure 7:
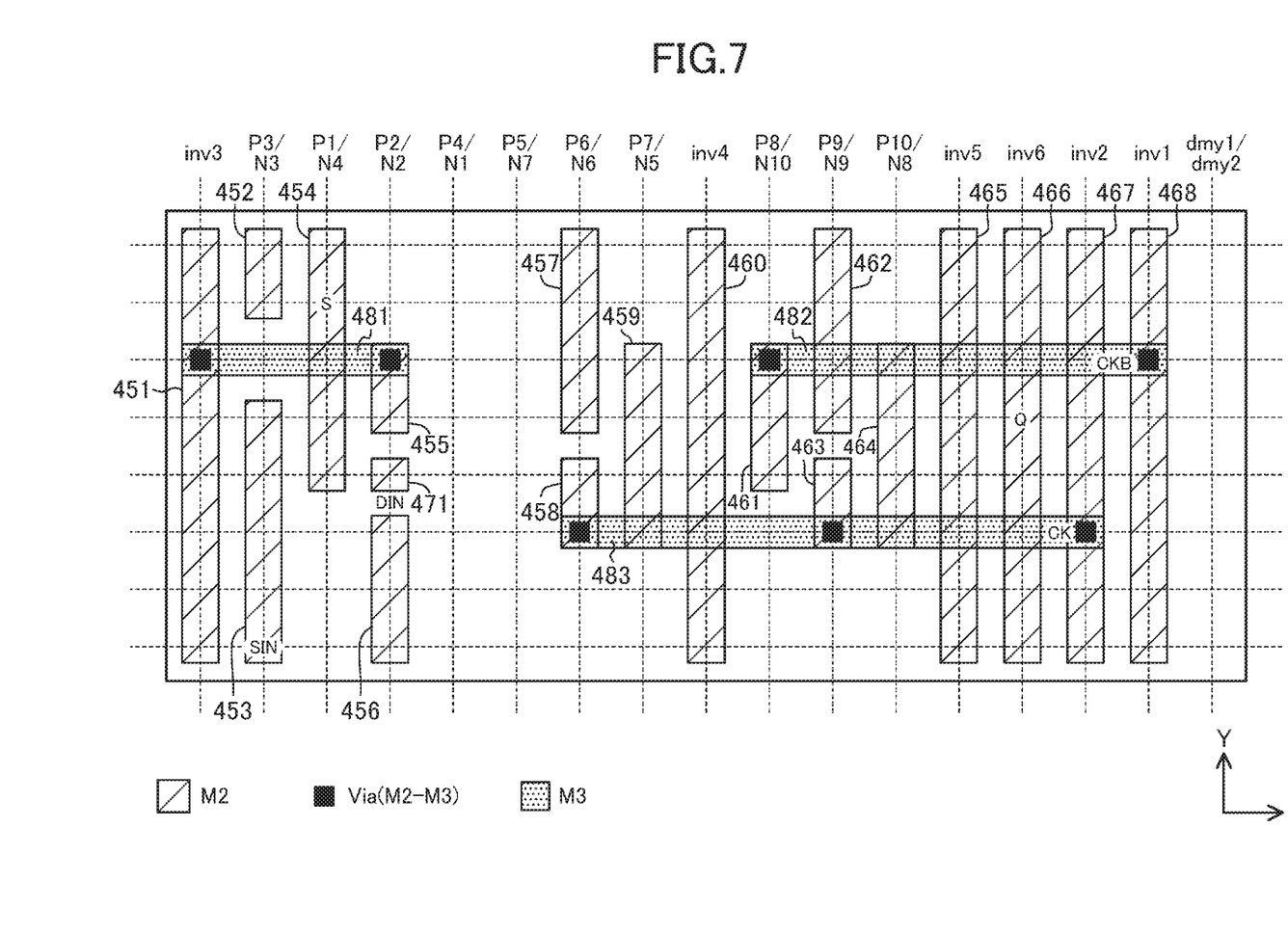
FIG. 7 is a layer-by-layer plan view of the layout structure of FIG. 2.

FIGS. 2, 3A-3B, and 4 to 7 are views showing a layout structure of a standard cell according to this embodiment. This standard cell implements the flipflop circuit shown in FIG. 1. FIG. 2 is a plan view, FIGS. 3A and 3B are cross-sectional views, and FIGS. 4 to 7 are layer-by-layer plan views. Specifically, FIGS. 3A and 3B are cross-sectional views in the horizontal direction as viewed from top in FIG. 2, where FIG. 3A shows a cross section taken along line X1-X1' and FIG. 3B shows a cross section taken along line X2-X2'. FIG. 4 shows VNW FETs and layers below them, FIG. 5 shows local interconnects and M1 interconnects, FIG. 6 shows M1 and M2 interconnects, and FIG. 7 shows M2 and M3 interconnects.

Note that, in the following description, in the plan views such as FIG. 2, the horizontal direction as viewed from the figure is referred to as the X direction (corresponding to the first direction) and the vertical direction is referred to as the Y direction (corresponding to the second direction). Also, the dashed lines running vertically and horizontally in the plan views such as FIG. 2 and the dashed lines running vertically in the cross-sectional views such as FIGS. 3A-3B represent grid lines used for placement of components at the time of designing. The grid lines are arranged at equal spacing in the X direction and arranged at equal spacing in the Y direction. The grid spacing may be the same, or different from each other, in the X and Y directions. Also, the grid spacing may be different between layers. For example, grid lines for NNW FETs and grid lines for M1 interconnects may be arranged at different spacing. Further, the components are not necessarily required to lie on grid lines. It is however preferable to place the components on grid lines from the standpoint of preventing or reducing fabrication variations.

The device structure according to this embodiment is based on the structure of FIG. 9A, although it can be a structure based on the structure of FIG. 8 or FIG. 9B, or based on any other device structure. Also, for easy understanding of the figures, illustration of the wells, the STIs, the insulating films, the silicide layers on the bottoms, the silicide layers on the tops, and the sidewalls of the tops is omitted. This also applies to the subsequent drawings.

As shown in FIG. 2 and other figures, power supply interconnects VDD and VSS extending in the X direction are provided in an M1 interconnect layer. Note that VDD and VSS are used as symbols indicating both the power supply interconnects and the power supply voltages supplied through the power supply interconnects.

A p-type transistor region (shown as Pch Tr.) is formed under the power supply interconnect VDD, and an n-type transistor region (shown as Nch Tr.) is formed under the power supply interconnect VSS.

In the p-type transistor region, arranged in the X direction are a p-type transistor constituting the inverter inv3, the transistors P3, P1, P2, P4, P5, P6, and P7, a p-type transistor constituting the inverter inv4, the transistors P8, P9, and P10, p-type transistors constituting the inverters inv5, inv6, inv2, and inv1, and the dummy transistor dmy1 in this order from the left as viewed from the figure. Each of these transistors has two VNWs arranged side by side in the Y direction.

In the n-type transistor region, arranged in the X direction are an n-type transistor constituting the inverter inv3, the transistors N3, N4, N2, N1, N7, N6, and N5, an n-type transistor constituting the inverter inv4, the transistors N10, N9, and N8, n-type transistors constituting the inverters inv5, inv6, inv2, and inv1, and the dummy transistor dmy2 in this order from the left as viewed from the figure. Each of these transistors has two VNWs arranged side by side in the Y direction.

Bottom regions 111 to 121 are formed in the p-type transistor region. The bottom regions 111 to 121 are the same in position and size in the Y direction. In the X direction, the bottom region 113 is integrally formed over three grid lines, the bottom regions 112 and 114 to 116 are each integrally formed over two grid lines, and the other bottom regions 111 and 117 to 121 each have a width corresponding to one grid cell.

The bottom of the p-type transistor constituting the inverter inv3 is connected to the bottom region 111. The bottoms of the transistors P3 and P1 are connected to the bottom region 112. The bottoms of the transistors P2, P4 and P5 are connected to the bottom region 113. The bottoms of the transistors P6 and P7 are connected to the bottom region 114. The bottoms of the p-type transistor constituting the inverter inv4 and the transistor P8 are connected to the bottom region 115. The bottoms of the transistors P9 and P10 are connected to the bottom region 116. The bottom of the p-type transistor constituting the inverter inv5 is connected to the bottom region 117. The bottom of the p-type transistor constituting the inverter inv6 is connected to the bottom region 118. The bottom of the p-type transistor constituting the inverter inv2 is connected to the bottom region 119. The bottom of the p-type transistor constituting the inverter inv1 is connected to the bottom region 120. The bottom of the dummy transistor dmy1 is connected to the bottom region 121.

Bottom regions 131 to 143 are formed in the n-type transistor region. The bottom regions 131 to 143 are the same in position and size in the Y direction. In the X direction, the bottom regions 132 to 134 and 137 are each integrally formed over two grid lines, and the other bottom regions 131, 135, 136, and 138 to 143 each have a width corresponding to one grid cell.

The bottom of the n-type transistor constituting the inverter inv3 is connected to the bottom region 131. The bottoms of the transistors N3 and N4 are connected to the bottom region 132. The bottoms of the transistors N2 and N1 are connected to the bottom region 133. The bottoms of the transistors N7 and N6 are connected to the bottom region 134. The bottom of the transistor N5 is connected to the bottom region 135. The bottom of the n-type transistor constituting the inverter inv4 is connected to the bottom region 136. The bottoms of the transistors N10 and N9 are connected to the bottom region 137. The bottom of the transistor N8 is connected to the bottom region 138. The bottom of the n-type transistor constituting the inverter inv5 is connected to the bottom region 139. The bottom of the n-type transistor constituting the inverter inv6 is connected to the bottom region 140. The bottom of the n-type transistor constituting the inverter inv2 is connected to the bottom region 141. The bottom of the n-type transistor constituting the inverter inv1 is connected to the bottom region 142. The bottom of the dummy transistor dmy2 is connected to the bottom region 143.

Gate interconnects 211 to 227 are formed in parallel to extend in the Y direction, and are the same in position and size in the Y direction. The gate interconnects 211 to 227 each connect the gates of the p-type transistor and the n-type transistor placed at the same position in the X direction. Specifically, the gates of the p-type transistor and the n-type transistor constituting the inverter inv3 are mutually connected by the gate interconnect 211. The gates of the transistors P3 and N3 are mutually connected by the gate interconnect 212. The gates of the transistors P1 and N4 are mutually connected by the gate interconnect 213. The gates of the transistors P2 and N2 are mutually connected by the gate interconnect 214. The gates of the transistors P4 and N1 are mutually connected by the gate interconnect 215. The gates of the transistors P5 and N7 are mutually connected by the gate interconnect 216. The gates of the transistors P6 and N6 are mutually connected by the gate interconnect 217. The gates of the transistors P7 and N5 are mutually connected by the gate interconnect 218. The gates of the p-type transistor and the n-type transistor constituting the inverter inv4 are mutually connected by the gate interconnect 219. The gates of the transistors P8 and N10 are mutually connected by the gate interconnect 220. The gates of the transistors P9 and N9 are mutually connected by the gate interconnect 221. The gates of the transistors P10 and N8 are mutually connected by the gate interconnect 222. The gates of the p-type transistor and the n-type transistor constituting the inverter inv5 are mutually connected by the gate interconnect 223. The gates of the p-type transistor and the n-type transistor constituting the inverter inv6 are mutually connected by the gate interconnect 224. The gates of the p-type transistor and the n-type transistor constituting the inverter inv2 are mutually connected by the gate interconnect 225. The gates of the p-type transistor and the n-type transistor constituting the inverter inv1 are mutually connected by the gate interconnect 226. The gates of the dummy transistors dmy1 and dmy2 are mutually connected by the gate interconnect 227.

The top of the p-type transistor constituting the inverter inv3 is connected to the power supply interconnect VDD through a local interconnect 311. The top of the n-type transistor constituting the inverter inv3 is connected to the power supply interconnect VSS through a local interconnect 351. The bottom regions 111 and 131 are mutually connected through an M2 interconnect 451 formed in a layer above them. The M2 interconnect 451 is to be the output of the inverter inv3. The gate interconnect 211 is connected to an M2 interconnect 454 through a local interconnect 331 and an M1 interconnect 431. The M2 interconnect 454 is to be the input of the inverter inv3, to which the scan mode signal S is supplied.

The top of the transistor P3 is connected with the top of the transistor P4 through a local interconnect 312, an M1 interconnect 414, and a local interconnect 315. The top of the transistor P1 is connected with the top of the transistor P2 through a local interconnect 313, an M1 interconnect 411, and a local interconnect 314. The top of the transistor P5 is connected with the top of the transistor P7 through a local interconnect 316, an M1 interconnect 415, and a local interconnect 318. The top of the transistor P6 is connected with the power supply interconnect VDD through a local interconnect 317. The bottom region 112 is connected to the power supply interconnect VDD through an M2 interconnect 452.

The top of the transistor N3 is connected with the power supply interconnect VSS through a local interconnect 352. The top of the transistor N4 is connected with the top of the transistor N2 through a local interconnect 353, an M1 interconnect 438, and a local interconnect 354. The M1 interconnect 438 is connected with an M1 interconnect 441 through an M2 interconnect 456. The top of the transistor N1 is connected with the power supply interconnect VSS through a local interconnect 355. The top of the transistor N7 is connected with the top of the transistor N5 through a local interconnect 356, an M1 interconnect 439, and a local interconnect 358. The top of the transistor N6 is connected with the power supply interconnect VSS through a local interconnect 357. The bottom region 135 is connected to the M1 interconnect 441.

The gate interconnect 212 is connected with an M2 interconnect 453 through a local interconnect 332 and an M1 interconnect 417. The scan data input SIN is supplied to the M2 interconnect 453. The gate interconnect 213 is connected with the M2 interconnect 454 through a local interconnect 333 and the M1 interconnect 431. The scan mode signal S is supplied to the M2 interconnect 454. The gate interconnect 214 is connected with an M1 interconnect 432 through a local interconnect 334. The M1 interconnect 432 is connected with an M2 interconnect 471 to which the data input DIN is supplied. The gate interconnect 215 is connected with the M2 interconnect 451 through a local interconnect 335, an M1 interconnect 418, an M2 interconnect 455, and an M3 interconnect 481.

The gate interconnect 216 is connected with an M3 interconnect 483 through a local interconnect 336, an M1 interconnect 433, and an M2 interconnect 458. The internal clock CK is supplied to the M3 interconnect 483. The gate interconnect 217 is connected with an M1 interconnect 412 through a local interconnect 337 and an M2 interconnect 457. The gate interconnect 218 is connected to an M1 interconnect 434 through a local interconnect 338.

The top of the p-type transistor constituting the inverter inv4 is connected to the power supply interconnect VDD through a local interconnect 319. The top of the n-type transistor constituting the inverter inv4 is connected to the power supply interconnect VSS through a local interconnect 359. The bottom regions 115 and 136 are mutually connected through an M2 interconnect 460 formed in a layer above them. The M2 interconnect 460 is to be the output of the inverter inv4. The M2 interconnect 460 is connected with the M1 interconnect 412. The gate interconnect 219 is connected to an M2 interconnect 459 through a local interconnect 339 and an M1 interconnect 419. The M2 interconnect 459 is to be the input of the inverter inv4, which corresponds to the feedback node nd1 in the master latch unit 30.

The top of the transistor P8 is connected with the top of the transistor P10 through a local interconnect 320, an M1 interconnect 416, and a local interconnect 322. The top of the transistor P9 is connected with the power supply interconnect VDD through a local interconnect 321. The top of the transistor N10 is connected with the top of the transistor N8 through a local interconnect 360, an M1 interconnect 440, and a local interconnect 362. The top of the transistor N9 is connected with the power supply interconnect VSS through a local interconnect 361. The gate interconnect 220 is connected with an M2 interconnect 461 through a local interconnect 340 and the M1 interconnect 434. The gate interconnect 221 is connected with an M1 interconnect 413 through a local interconnect 341, an M1 interconnect 445, and an M2 interconnect 462. The gate interconnect 222 is connected with an M2 interconnect 463 through a local interconnect 342 and an M1 interconnect 435. The bottom region 138 is connected with the M2 interconnect 460 through an M1 interconnect 442.

The top of the p-type transistor constituting the inverter inv5 is connected to the power supply interconnect VDD through a local interconnect 323. The top of the n-type transistor constituting the inverter inv5 is connected to the power supply interconnect VSS through a local interconnect 363. The bottom regions 117 and 139 are mutually connected through an M2 interconnect 465 formed in a layer above them. The M2 interconnect 465 is to be the output of the inverter inv5. The M2 interconnect 465 is connected with the M1 interconnect 413. The gate interconnect 223 is connected with an M2 interconnect 464 through a local interconnect 343 and an M1 interconnect 420. The M2 interconnect 464 is to be the input of the inverter inv5, which corresponds to the feedback node nd2 in the slave latch unit 40.

The top of the p-type transistor constituting the inverter inv6 is connected to the power supply interconnect VDD through a local interconnect 324. The top of the n-type transistor constituting the inverter inv6 is connected to the power supply interconnect VSS through a local interconnect 364. The bottom regions 118 and 140 are mutually connected through an M2 interconnect 466 formed in a layer above them. The M2 interconnect 466 is to be the output of the inverter inv6, from which the data output Q is output. The gate interconnect 224 is connected with the M2 interconnect 465 that is to be the output of the inverter inv5 through a local interconnect 344 and an M1 interconnect 436.

The top of the p-type transistor constituting the inverter inv2 is connected to the power supply interconnect VDD through a local interconnect 325. The top of the n-type transistor constituting the inverter inv2 is connected to the power supply interconnect VSS through a local interconnect 365. The bottom regions 119 and 141 are mutually connected through an M2 interconnect 467 formed in a layer above them. The M2 interconnect 467 is to be the output of the inverter inv2, from which the internal clock CK is output. The gate interconnect 225 is connected with an M2 interconnect 468 through a local interconnect 345 and an M1 interconnect 437. The M2 interconnect 468 is to be the input of the inverter inv2.

The top of the p-type transistor constituting the inverter inv1 is connected to the power supply interconnect VDD through a local interconnect 326. The top of the n-type transistor constituting the inverter inv1 is connected to the power supply interconnect VSS through a local interconnect 366. The bottom regions 120 and 142 are mutually connected through the M2 interconnect 468 formed in a layer above them. The M2 interconnect 468 is to be the output of the inverter inv1, from which the internal clock CKB is output. The gate interconnect 226 is connected with an M1 interconnect 421 through a local interconnect 346. The clock input CKIN is supplied to the M1 interconnect 421.

The top of the dummy transistor dmy1 is connected to the power supply interconnect VDD through a local interconnect 327. The top of the dummy transistor dmy2 is connected to the power supply interconnect VSS through a local interconnect 367. The bottom region 121 and the gate interconnect 227 are connected to the power supply interconnect VDD through the local interconnect 327. The bottom region 143 is connected to the power supply interconnect VSS through the local interconnect 367.

The data input DIN is supplied to the M2 interconnect 471. Since the M2 interconnect 471 is connected to the gate interconnect 214 through the M1 interconnect 432 and the local interconnect 334, the data input DIN is supplied to the gates of the transistors P2 and N2.

The scan data input SIN is supplied to e M2 interconnect 453. Since the M2 interconnect 453 is connected to the gate interconnect 212 through the M1 interconnect 417 and the local interconnect 332, the scan data input SIN is supplied to the gates of the transistors P3 and N3.

The scan mode signal S is supplied to the M2 interconnect 454. Since the M2 interconnect 454 is connected to the gate interconnects 211 and 213 through the M1 interconnect 431 and the local interconnects 331 and 333, the scan mode signal S is supplied to the gates of the p-type transistor and the n-type transistor constituting the inverter inv3 and the gates of the transistors P1 and N4.

The clock input CKIN is supplied to the M1 interconnect 421. Since the M1 interconnect 421 is connected to the gate interconnect 226 through the local interconnect 346, the clock input CKIN is supplied to the gates of the p-type transistor and the n-type transistor constituting the inverter inv1. The output of the inverter inv1, i.e., the internal clock CKB is output from the M2 interconnect 468. Since the M2 interconnect 468 is connected to the gate interconnect 225 through the M1 interconnect 437 and the local interconnect 345, the internal clock CKB is supplied to the gates of the p-type transistor and the n-type transistor constituting the inverter inv2. The output of the inverter inv2, i.e., the internal clock CK is output from the M2 interconnect 467.

The M2 interconnect 467 is connected with the M2 interconnects 458 and 463 through the M3 interconnect 483. The M2 interconnect 458 is connected to the gate interconnect 216 through the M1 interconnect 433 and the local interconnect 336. The M2 interconnect 463 is connected to the gate interconnect 222 through the M1 interconnect 435 and the local interconnect 342. That is, the internal clock CK is supplied to the gates of the transistors P5, N7, P10, and N8.

The M2 interconnect 468 is connected with the M2 interconnect 461 through an M3 interconnect 482. The M2 interconnect 461 is connected to the gate interconnects 218 and 220 through the M1 interconnect 434 and the local interconnects 338 and 340. That is, the internal clock CKB is supplied to the gates of the transistors P7, N5, P8, and N10.

The data output Q is output from the M2 interconnect 466 that is to be the output of the inverter inv6.

The layout structure described above has the following features.

In the master latch unit 30, attention is focused on the transistors connected to the feedback node nd1. The nodes (sources or drains) of the transistors P5 and N5 that output a signal to the feedback node nd1 are connected to the feedback node nd1. Also, the nodes (drains) of the transistors P7 and N7 are connected to the feedback node nd1. In the above-described layout structure, all of the transistors P5, N5, P7, and N7 are connected to the feedback node nd1 at their tops. That is, the local interconnect 316 connected to the top of the transistor P5 and the local interconnect 318 connected to the top of the transistor P7 are mutually connected through the M1 interconnect 415. The local interconnect 356 connected to the top of the transistor N7 and the local interconnect 358 connected to the top of the transistor N5 are mutually connected through the M1 interconnect 439. Further, the M1 interconnect 415 and the M1 interconnect 439 are mutually connected through the M2 interconnect 459.

Likewise, in the slave latch unit 40, attention is focused on the transistors connected to the feedback node nd2. The nodes (sources or drains) of the transistors P8 and N8 that output a signal to the feedback node nd2 are connected to the feedback node nd2. Also, the nodes (drains) of the transistors P10 and N10 are connected to the feedback node nd2. In the above-described layout structure, all of the transistors P8, N8, P10, and N10 are connected to the feedback node nd2 at their tops. That is, the local interconnect 320 connected to the top of the transistor P8 and the local interconnect 322 connected to the top of the transistor P10 are mutually connected through the M1 interconnect 416. The local interconnect 360 connected to the top of the transistor N10 and the local interconnect 362 connected to the top of the transistor N8 are mutually connected through the M1 interconnect 440. Further, the M1 interconnect 416 and the M1 interconnect 440 are mutually connected through the M2 interconnect 464.

As described above, in the master latch unit 30, all of the transistors P5, N5, P7, and N7 to be connected to the feedback node nd1 via their nodes are connected to the feedback node nd1 at their tops, whereby the number of signal interconnects for the connection can be reduced. Also, in the slave latch unit 40, all of the transistors P8, N8, P10, and N10 to be connected to the feedback node nd2 via their nodes are connected to the feedback node nd2 at their tops, whereby the number of signal interconnects for the connection can be reduced. Therefore, the area of the standard cell can be reduced.

Also, in the master latch unit 30, the transistors P5 and N7 receive the internal clock CK at their gates, and the transistors N5 and P7 receive the internal clock CKB at their gates. The transistors P5 and N7 are placed at the same position in the X direction, and the gates thereof are mutually connected by the gate interconnect 216. The transistors P7 and N5 are placed at the same position in the X direction, and the gates thereof are mutually connected by the gate inters interconnect 218. The gate interconnects 216 and 218 are formed to extend in the Y direction.

Likewise, in the slave latch unit 40, the transistors P8 and N10 receive the internal clock CKB at their gates, and the transistors N8 and P10 receive the internal clock CK at their gates. The transistors P8 and N10 are placed at the same position in the X direction, and the gates thereof are mutually connected by the gate interconnect 220. The transistors P10 and N8 are placed at the same position in the X direction, and the gates thereof are mutually connected by the gate interconnect 222. The gate interconnects 220 and 222 are formed to extend in the Y direction.

As described above, in the master latch unit 30, by placing the transistors P5 and N7 to receive the internal clock CK at their gates at the same position in the X direction and mutually connecting the gates thereof, and also by placing the transistors N5 and P7 to receive the internal clock CKB at their gates at the same position in the X direction and mutually connecting the gates thereof, the number of interconnects for the gate connection can be reduced. Likewise, in the slave latch unit 40, by placing the transistors P8 and N10 to receive the internal clock CKB at their gates at the same position in the X direction and mutually connecting the gates thereof, and also by placing the transistors N8 and P10 to receive the internal clock CK at their gates at the same position in the X direction and mutually connecting the gates thereof, the number of interconnects for the gate connection can be reduced. Therefore, the area of the standard cell can be reduced. Moreover, by providing the gate interconnects 216, 218, 220, and 222 extending in the Y direction for the gate connection, the gate interconnects can be made uniform in shape. This improves the fabrication precision and also can prevent or reduce variations in performance.

Attention is also focused on the transistors P2 and P4 in the input data select unit 10 and the transistor P5 in the master latch unit 30. The nodes (drains) of the transistors P2, P4, and P5 on one side are mutually connected, but the nodes of the transistors P2, P4, and P5 on the other side are independent from one another and electrically isolated. In the above-described layout structure, the wide bottom region 113 is formed in the p-type transistor region, and the bottoms of the transistors P2, P4, and P5 are connected in common to the bottom region 113. In this way, for the transistors P2, P4, and P5 of which the nodes on one side are mutually connected but the nodes on the other side are electrically isolated from one another, by setting the mutually connected nodes to be the bottoms and connecting the bottoms to the common bottom region 113, the area of the standard cell can be reduced.

The bottom regions 111 to 121 in the p-type transistor region are formed to be the same in size and position in the Y direction, and the bottom regions 131 to 143 in the n-type transistor region are formed to be the same in size and position in the Y direction. This makes the fabrication easy, enhances the fabrication precision, and can prevent or reduce variations in performance.

The gate interconnects 211 to 227 all extend in the Y direction, are the same in size and position in the Y direction, and have the same interconnect width. This makes the fabrication easy, enhances the fabrication precision, and can prevent or reduce variations in performance.

The local interconnects 311 to 327, 331 to 346, and 351 to 367 all extend in the Y direction and have the same interconnect width. This makes the fabrication easy and enhances the fabrication precision. The interconnects 411 to 421 and 431 to 442 in the M1 interconnect layer all extend in the X direction and have the same interconnect width. This makes the fabrication easy and enhances the fabrication precision. The interconnects 451 to 468 in the M2 interconnect layer all extend in the Y direction and have the same interconnect width. This makes the fabrication easy and enhances the fabrication precision. The interconnects 481 to 483 in the M3 interconnect layer all extend in the X direction and have the same interconnect width. This makes the fabrication easy and enhances the fabrication precision.

Alterations

While the planar shape of the VNWs is a circle in the layout structure example described above, it is not limited to a circle. For example, the planar shape of the VNWs can be a rectangle or an oval. When the VNWs have a planar shape extending long in one direction like an oval, the extension direction is preferably uniform. Also, the positions of the ends are preferably aligned. In the standard cell, all VNWs are not necessarily required to have the same shape. VNWs having different planar shapes may be present in a mixed manner.

While each VNW FET is constituted by two VNWs in the layout structure example described above, the number of VNWs constituting the VNW FET is not limited to this. Also, in the standard cell, it is not necessarily required to constitute all VNW FETs by the same number of VNWs, but VNW FETs having different numbers of VNWs may be present in a mixed manner.

In the above embodiment, the layout structure was described taking a standard cell that implements a flipflop circuit as an example. At least some of the features of the layout structure is also applicable to standard cells implementing other circuits. For example, in the above embodiment, for the transistors P2 and P4 in the input data select unit 10 and the transistor P5 in the master latch unit 30, the mutually connected nodes thereof are set to be their bottoms and connected to the common bottom region 113. Similarly, in a standard cell that implements another circuit, also, for at least three transistors of the same conductivity type of which the nodes on one side are mutually connected and the nodes on the other side are electrically isolated from one another, the mutually connected nodes may be set to be their bottoms and connected to a common bottom region.

According to the present disclosure, reduction in area can be realized for a semiconductor integrated circuit device provided with a flipflop circuit using VNW FETs. The present disclosure is therefore useful for improvement of the performance of a semiconductor chip, for example.

What is claimed is:

1. A semiconductor integrated circuit device comprising a standard cell configured to implement a flipflop circuit,
    wherein the flipflop circuit includes a first circuit unit,
    the first circuit unit includes:
        a first node,
        a first p-type transistor and a first n-type transistor each of which receives an input signal at one of source or drain and is connected to the first node at the other of source or drain, and
        a second p-type transistor and a second n-type transistor each of which is connected to the first node at one of source or drain, and
    in the standard cell, the first and second p-type transistors and the first and second n-type transistors are vertical nanowire (VNW) FETs and are connected to the first node at their top electrodes.

2. The semiconductor integrated circuit device of claim 1, wherein
    the first p-type transistor and the second n-type transistor receive a first clock at their gate electrodes, and
    the first n-type transistor and the second p-type transistor receive a second clock that is a reversed clock from the first clock, at their gate electrodes.

3. A semiconductor integrated circuit device comprising a standard cell configured to implement a flipflop circuit,
    wherein the flipflop circuit includes a first circuit unit,
    the first circuit unit includes:
        a first p-type transistor configured to receive a first clock at its gate electrode, a first n-type transistor configured to receive a second clock that is a reversed clock from the first clock, at its gate electrode,
a second p-type transistor configured to receive the second clock at its gate electrode, and
a second n-type transistor configured to receive the first clock at its gate electrode, and in the standard cell,
the first and second p-type transistors and the first and second n-type transistors are vertical nanowire (VNW) FETs,
the first p-type transistor and the second n-type transistor are placed at the same position in a first direction, and their gate electrodes are connected by a first gate interconnect, and
the first n-type transistor and the second p-type transistor are placed at the same position in the first direction, and their gate electrodes are connected by a second gate interconnect.

4. The semiconductor integrated circuit device of claim 3, wherein the first and second gate interconnects are formed to extend in a second direction vertical to the first direction.

\* \* \* \* \*